United States Patent
Yang et al.

(10) Patent No.: US 10,896,544 B2
(45) Date of Patent: Jan. 19, 2021

(54) SYSTEM AND METHOD FOR PROVIDING SIMULATED ENVIRONMENT

(71) Applicant: HTC Corporation, Taoyuan (TW)

(72) Inventors: Hung-Yi Yang, Taoyuan (TW); Iok-Kan Choi, Taoyuan (TW)

(73) Assignee: HTC Corporation, Taoyuan (TW)

(*) Notice: Subject to any disclaimer, the term of this patent is extended or adjusted under 35 U.S.C. 154(b) by 36 days.

(21) Appl. No.: 15/717,927

(22) Filed: Sep. 27, 2017

(65) Prior Publication Data

US 2018/0101990 A1    Apr. 12, 2018

Related U.S. Application Data

(60) Provisional application No. 62/405,251, filed on Oct. 7, 2016.

(51) Int. Cl.
*G06T 19/00* (2011.01)
*H04S 7/00* (2006.01)
(Continued)

(52) U.S. Cl.
CPC .......... *G06T 19/006* (2013.01); *G06F 3/011* (2013.01); *G06F 3/012* (2013.01); *G06K 9/00268* (2013.01); *G06K 9/00671* (2013.01); *G06K 9/48* (2013.01); *G06T 7/20* (2013.01); *G06T 7/50* (2017.01); *G06T 7/70* (2017.01); *G06T 13/40* (2013.01); *G06T 19/20* (2013.01); *H04S 7/303* (2013.01); *H04S 7/304* (2013.01);
(Continued)

(58) Field of Classification Search
None
See application file for complete search history.

(56) References Cited

U.S. PATENT DOCUMENTS

| 9,686,466 B1* | 6/2017 | Billinghurst ....... H04N 5/23238 |
| 2011/0069643 A1* | 3/2011 | Yoakum .............. H04L 65/4015 |
| | | 370/261 |

(Continued)

FOREIGN PATENT DOCUMENTS

| CN | 102404667 A | 4/2012 |
| CN | 104023005 A | 9/2014 |

(Continued)

OTHER PUBLICATIONS

Corresponding Taiwan office action dated Feb. 27, 2018.
Corresponding Chinese office action dated May 29, 2020.

*Primary Examiner* — Andrew G Yang
(74) *Attorney, Agent, or Firm* — CKC & Partners Co., LLC

(57) ABSTRACT

Present disclosure relates to a system for providing a simulated environment and a method thereof. The system comprises a first wearable device, a second wearable device and a computing device. The first wearable device is configured to output a scenario of the simulated environment and to output a first audio. The second wearable device is configured to collect an environmental sound around the second wearable device and send out the sound. The computing device is configured to merge the sound into the first audio according to an index and send the merged first audio to the first wearable device, wherein the index is determined by a relative distance and a relative direction between coordinates being assigned to the first wearable device and the second wearable device in the simulated environment.

17 Claims, 13 Drawing Sheets

(51) Int. Cl.
*G06F 3/01* (2006.01)
*G06T 7/50* (2017.01)
*G06T 7/70* (2017.01)
*G06K 9/00* (2006.01)
*G06K 9/48* (2006.01)
*G06T 7/20* (2017.01)
*G06T 13/40* (2011.01)
*G06T 19/20* (2011.01)
*H04R 27/00* (2006.01)
*G06T 15/20* (2011.01)

(52) U.S. Cl.
CPC .......... *G06T 15/20* (2013.01); *G06T 2215/16* (2013.01); *G06T 2219/024* (2013.01); *H04R 27/00* (2013.01); *H04R 2227/003* (2013.01); *H04S 2400/11* (2013.01); *H04S 2420/01* (2013.01)

(56) References Cited

U.S. PATENT DOCUMENTS

| | | | | |
|---|---|---|---|---|
| 2013/0002813 A1* | 1/2013 | Vaught | ............... | H04N 13/161 348/43 |
| 2013/0065692 A1* | 3/2013 | Aronzon | ............... | A63F 13/216 463/42 |
| 2013/0236040 A1* | 9/2013 | Crawford | ............... | H04S 7/304 381/310 |
| 2014/0064037 A1* | 3/2014 | Alameh | ............... | G04G 21/08 367/199 |
| 2015/0235434 A1* | 8/2015 | Miller | ............... | G06F 3/013 345/633 |
| 2015/0279079 A1 | 10/2015 | Wieczorek | | |
| 2015/0301592 A1* | 10/2015 | Miller | ............... | G06F 3/011 345/156 |
| 2016/0088417 A1* | 3/2016 | Kim | ............... | G02B 27/017 381/17 |
| 2016/0225164 A1* | 8/2016 | Tomlin | ............... | G06T 19/006 |
| 2017/0127035 A1* | 5/2017 | Kon | ............... | H04S 5/02 |
| 2017/0282062 A1* | 10/2017 | Black | ............... | A63F 13/25 |
| 2017/0294044 A1* | 10/2017 | Yerli | ............... | H04N 21/4302 |
| 2018/0020312 A1* | 1/2018 | Visser | ............... | H04R 5/033 |
| 2018/0349088 A1* | 12/2018 | Leppanen | ............... | G06F 3/011 |

FOREIGN PATENT DOCUMENTS

| | | |
|---|---|---|
| CN | 104423569 A | 3/2015 |
| CN | 102591449 B | 9/2016 |
| TW | 201537218 A | 10/2015 |
| TW | 201621557 A | 6/2016 |

\* cited by examiner

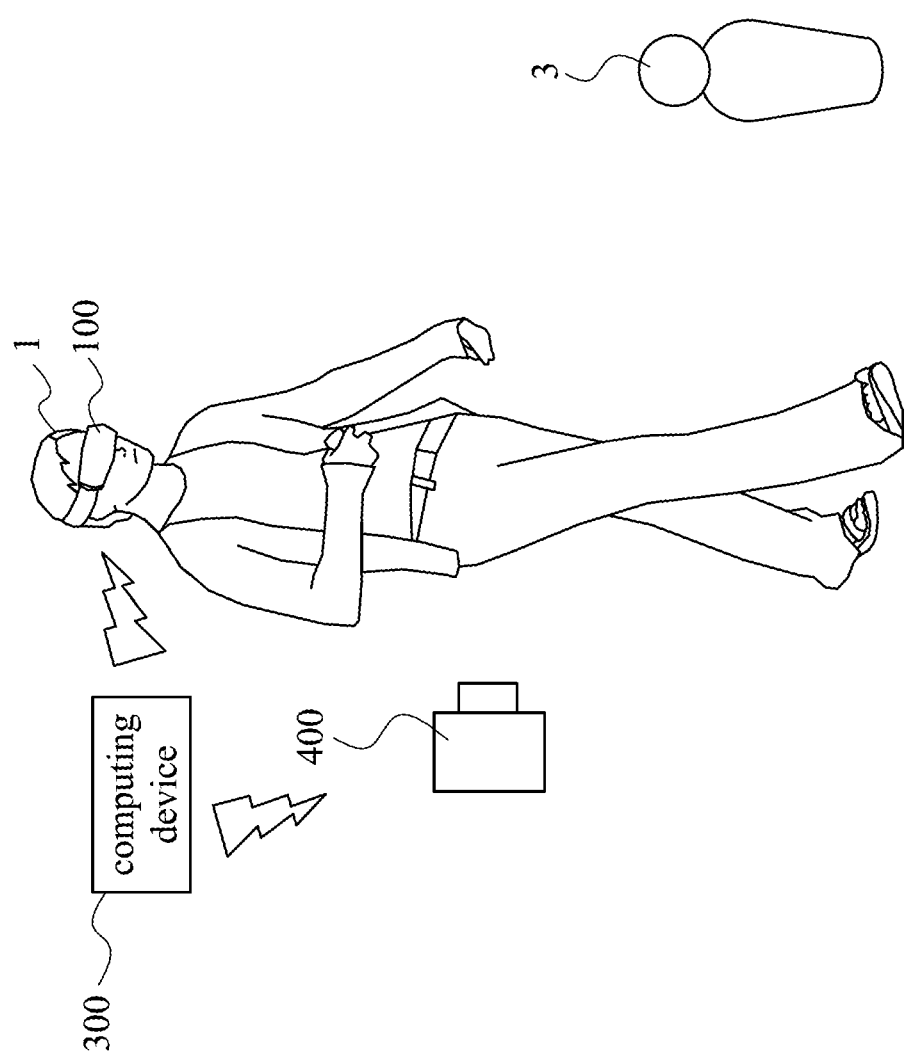

SYSTEM AND METHOD FOR PROVIDING SIMULATED ENVIRONMENT

CROSS-REFERENCE TO RELATED APPLICATION

This application claims priority to U.S. Provisional Application Ser. No. 62/405,251, filed on Oct. 7, 2016, which is herein incorporated by reference.

BACKGROUND

Field of Invention

Present disclosure relates to a system and a method for providing simulated environment. More particularly, the present disclosure relates to a system and a method for providing simulated environment to multiple users.

Description of Related Art

Applications of simulated environments, such as virtual reality and augmented reality, are considerably useful in many approaches. As can be seen from the market, simulated environments are mostly provided in games or demonstrating occasions. Whether it is games or demonstrating occasions, simulated environments are usually being provided to multiple users. However, despite how marvelous the simulated objects or the virtual events would be, the social experience in the simulated environments is always something people would concern about. In fact, in current applications, communications with other users in the simulated environments are very limited. To provide better social experiences in the simulated environment is indeed a challenge to people in the art.

SUMMARY

The disclosure relates to a system for providing a simulated environment, comprising a first wearable device, a second wearable device and a computing device. The first wearable device is configured to output a scenario of the simulated environment and to output a first audio. The second wearable device is configured to collect an environmental sound around the second wearable device and send out the environmental sound. The computing device is configured to merge the environmental sound into the first audio according to an index and send the merged first audio to the first wearable device, wherein the index is determined by a relative distance and a relative direction between coordinates being assigned to the first wearable device and the second wearable device in the simulated environment.

Another aspect of present disclosure is to provide a method for providing a simulated environment. The method comprises following steps: outputting, by a first wearable device, a scenario of the simulated environment and first audio; receiving, by a second wearable device, an environmental sound around the second wearable device; sending, by the second wearable device, the environmental sound to a computing device; merging, by the computing device, the environmental sound into the first audio according to an index, wherein the index is determined by a relative distance and a relative direction between coordinates being assigned to the first wearable device and the second wearable device in the simulated environment; and sending, by the computing device, the merged first audio to the first wearable device.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows:

FIG. 2A is a schematic diagram of a system for providing a simulated environment according to some embodiments of the present disclosure;

DETAILED DESCRIPTION

Figure 1A:
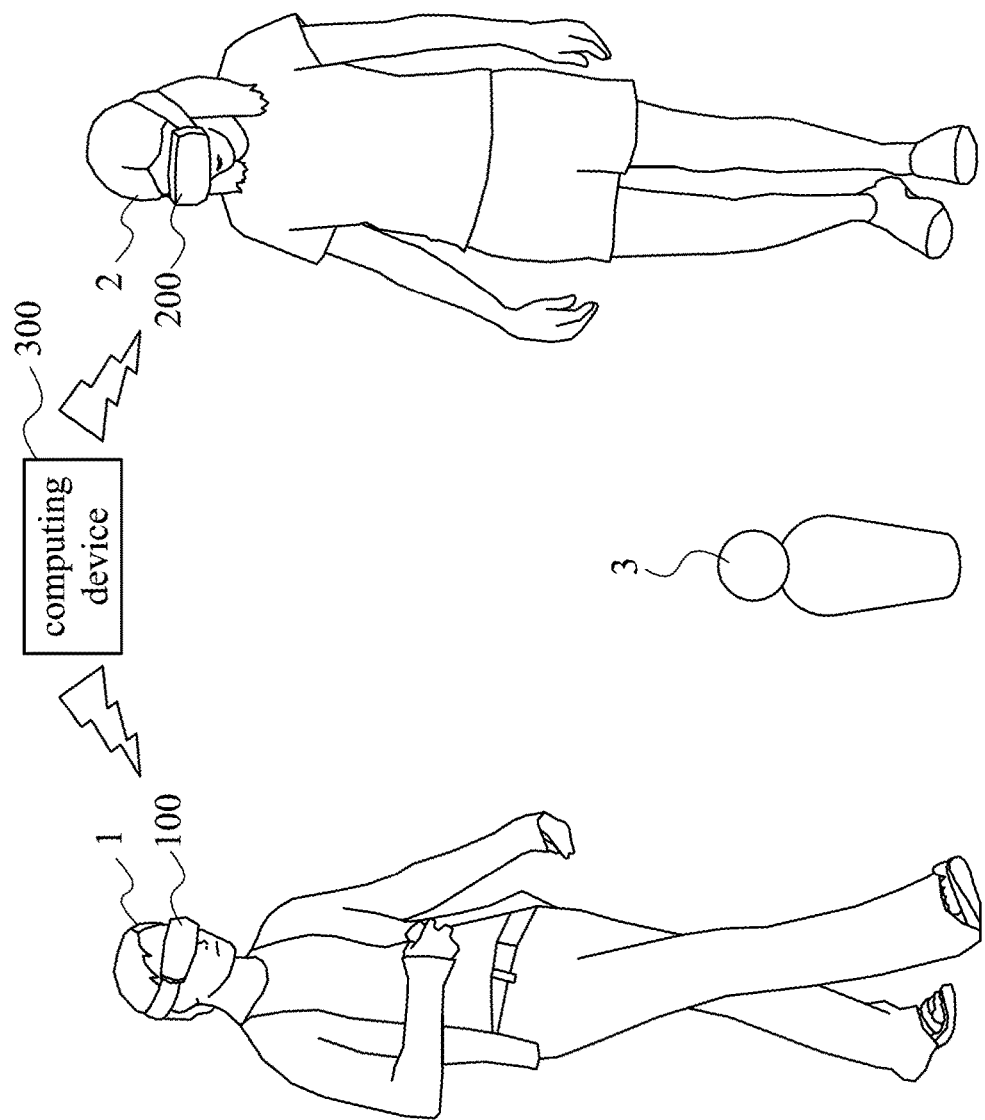
FIG. 1A is a schematic diagram of a system for providing a simulated environment according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1A is a schematic diagram of a system for providing a simulated environment according to some embodiments of the present disclosure. The simulated environment is an environment built with virtual objects illustrated by computing devices, for example, may be a virtual reality environment, an augmented reality environment or a mixed reality environment. As illustrated in FIG. 1A, in one embodiment, a first user 1 and a second user 2 are in a first space, which may be a room or an office. A doll 3 having a first contour is disposed on the ground of the first space. In the embodiment, the first user 1 wears a first user gear 100 on his head and the second user 2 wears a second user gear 200 on her head. The first user gear 100 and the second user gear 200 may be HMDs (Head-Mounted Displays). The first user gear 100 is configured to associate with a computing device 300 for displaying a first user scenario of a virtual reality environment to the first user 1 via a first visual interface. Aforesaid first visual interface can be a display of the first user gear 100, and wherein the first user scenario being displayed shows a partial view of the virtual reality environment from a viewpoint of the first user 1.

In the same manner, the second user gear 200 is configured to associate with the computing device 300 for displaying a second user scenario of the virtual reality environment to the second user 2 via a second visual interface as well. Aforesaid second visual interface can be a display of the second user gear 200, and wherein the second user scenario being displayed also shows a partial view of the same virtual reality environment from a viewpoint of the second user 2. The first user scenario and the second user scenario may or may not cover the same region of the virtual reality environment, depends on the fields of view from each user. A first sensor may be configured on the first user gear 100 to detect objects in a first field of view in front of the first user 1. The second user 2 and the doll 3 are currently located within the first field of view, which makes them detectable to the first user gear 100.

Figure 1B:
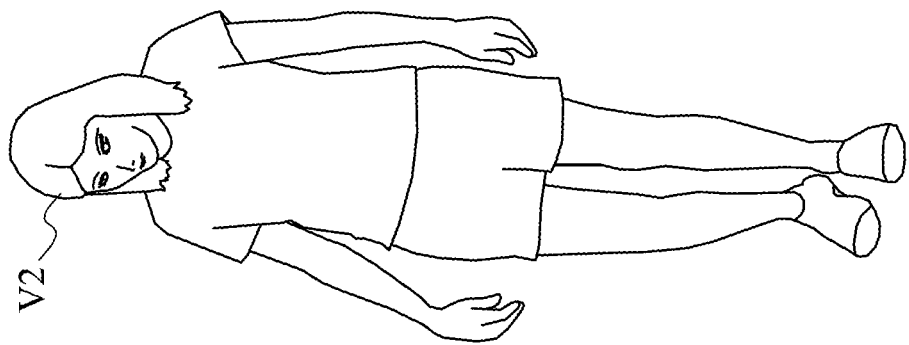
FIG. 1B is a schematic diagram of a system for providing a simulated environment according to the embodiments of FIG. 1A.
Figure 1B:
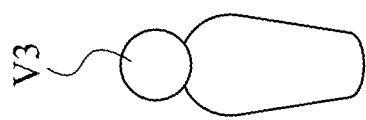
Figure 1B:
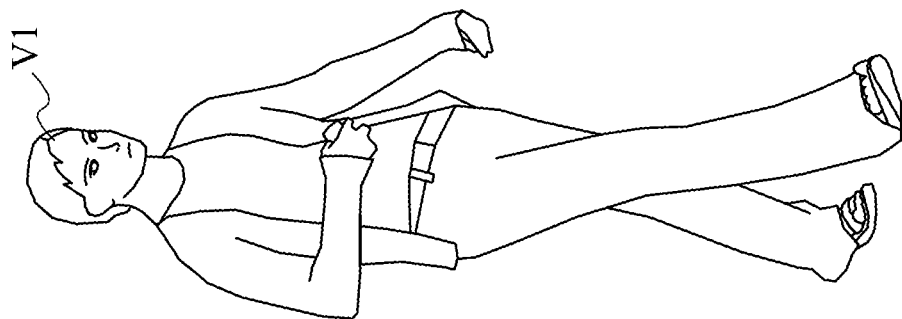

FIG. 1B is a schematic diagram of a system for providing a simulated environment according to the embodiments of FIG. 1A. FIG. 1B illustrates the virtual reality environment provided by the computing device from a view of a third person. It can be seen from the FIG. 1B that a first user avatar V1 and a second user avatar V2 are provided in the virtual reality environment, the first user avatar V1 and the second user avatar V2 are provided corresponding to the first user 1 and the second user 2 respectively. The first user avatar V1 is being provided at a first coordinate in the virtual reality environment, and the second user avatar V2 is being provided at a second coordinate in the virtual reality environment. The first coordinate is being assigned corresponding to the first user gear 100, and the second coordinate is being assigned corresponding to the second user gear 200. The first user scenario may be determined by a first direction that the first user gear 100 is directed to from the first coordinate. The second user scenario may be determined by a second direction that the second user gear 200 is directed to from the second coordinate.

In the embodiment, the first user gear 100 is also configured to retrieve a first face characteristic from the first user 1, may be by a camera, and send the first face characteristic to the computing device 300, as shown in FIG. 1A. The computing device 300 may illustrate the first user avatar V1 with a first face pattern corresponding to the first face characteristic, in that way, the computing device 300 may provide the first user avatar V1 with a virtual appearance more similar to the physical appearance of the first user 1 in the real world. In the same manner, by retrieving a second face characteristic via the second user gear 200, the computing device 300 may illustrate the second user avatar V2 with an appearance similar to the physical appearance of the second user 2. When the second coordinate locates within the first user scenario, the first user 1 may observe the second user avatar V2 via the first user gear 100.

Reference is now made to FIG. 1A and FIG. 1B. In the embodiment, since the doll 3 is in the first field of view, the first user 1 may select the doll 3 to be displayed in the virtual reality environment via the first user gear 100. The first user gear 100 may scan the doll 3 and generate scan information corresponding to the first contour of the doll 3. As shown in FIG. 1A, the scan information may be sent to the computing device 300 by the first user gear 100. The computing device 300 may illustrate a virtual doll V3 at a third coordinate in the virtual reality environment, and the virtual doll V3 is provided with a second contour corresponding to the first contour, as shown in FIG. 1B. The third coordinate may be assigned by the first user 1 or the computing device 300. As such, the first user 1 may select any object to be scanned in the real world, and a replica of the selected object may be demonstrated in the virtual reality environment. Since the virtual doll V3 is being provided at the third coordinate in the virtual reality environment, the second user 2 may observe the virtual doll V3 in the virtual reality environment if the third coordinate is located within the second user scenario.

In the embodiment, since the second user 2 is detectable by the first user gear 100 in the first space, the first user gear 100 is able to track a spatial vector of the second user gear 200 with respect to the first user gear 100. The spatial vector of the second user gear 200 may be sent to the computing device 300 by the first user gear 100. The spatial vector of the second user gear 200 may be used to determine a relative distance from the first user 1 to the second user 2 in the first space. The spatial vector of the second user gear 200 may also be used to determine a relative direction from the first user 1 to the second user 2 in the first space. It is to say, when the first user 1 wearing the first user gear 100 and the second user 2 wearing the second user gear 200 are staying in a common space, as long as one of the first user gear 100 or the second user gear 200 may detect each other, the computing device 300 may obtain the relative distance and the relative direction from the first user 1 to the second user 2 accordingly.

In some embodiments, the first user avatar V1 and the second user avatar V2 are provided at coordinates in a range consistent to the relative distance from the first user gear 100 to the second user gear 200, especially when the first user gear 100 and the second user gear 200 are in a common space. In some embodiments, the first user avatar V1 and the second user avatar V2 are provided at coordinates in a range inconsistent to the relative distance from the first user gear 100 to the second user gear 200. Even though the first user gear 100 the second user gear 200 are in a first distance in the real world, the computing device 300 may assign two coordinates distanced in a second distance to the first user gear 100 and the second user gear 200 in the virtual reality environment.

In some embodiments, not only to track the spatial vector of the second user gear 200, the first user gear 100 may also track motions of the second user 2, such as gestures or poses made by the second user 2, and generate motion information accordingly. The motion information may be sent to the computing device 300, as shown in FIG. 1A. The computing device 300 may therefore illustrate the second user avatar V2 to perform such motions according to the motion information. The fashion provides a way for retrieving positions of users in a common space without additional detectors other than wearable gears.

FIG. 2A is a schematic diagram of a system for providing a simulated environment according to some embodiments of the present disclosure. As illustrated in FIG. 2A, in one embodiment, a first user 1 is in a first space, and a doll 3 having a first contour is placed on the ground of the first space. An optical sensor 400, may be a camera, is settled in the first space. The optical sensor 400 is configured to obtain environmental images in the first space. From the environmental images, the optical sensor 400 may track a spatial vector of the first user gear 100 or the first user 1 with respect to the first space. The optical sensor 400 and the first user gear 100 are both in communication with a computing device 300. Similar to the embodiment of FIG. 1A and FIG. 1B, a first visual interface configured on the first user gear 100 is used to display a first user scenario to the first user 1, and wherein the first user scenario being displayed by the first visual interface shows a partial view of a virtual reality environment from a viewpoint of the first user 1.

Figure 2B:
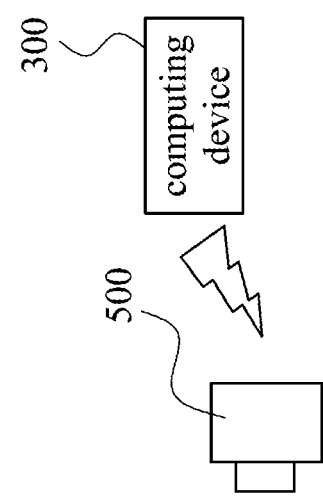
FIG. 2B is a schematic diagram of a system for providing a simulated environment according to some embodiments of the present disclosure.
Figure 2B:
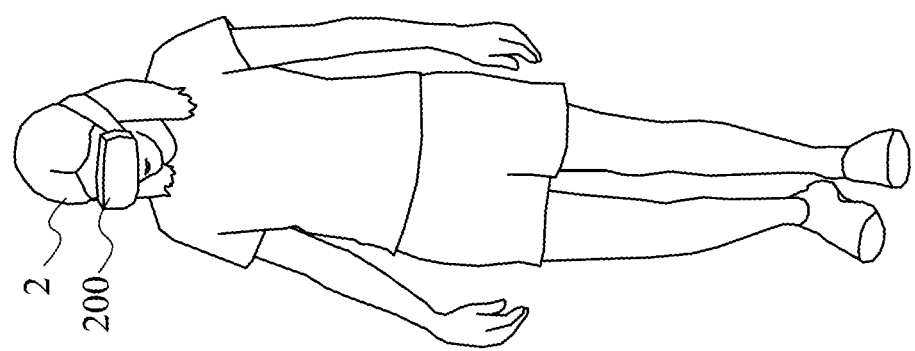

FIG. 2B is a schematic diagram of a system for providing a simulated environment according to the embodiments of FIG. 2A. As illustrated in FIG. 2B, in the embodiment, a second user 2 is in a second space other than the first space. An optical sensor 500, may be a camera, is settled in the second space. The optical sensor 500 is configured to obtain environmental images in the second space. From the environmental images, the optical sensor 500 may track a spatial vector of the second user gear 200 or the second user 2 with respect to the second space. The optical sensor 500 and the second user gear 200 are both in communication with a computing device 300. Similar to the embodiment of FIG. 1A and FIG. 1B, a second visual interface configured on the second user gear 200 is used to display a second user scenario to the second user 2, and wherein the second user scenario being displayed by the second visual interface shows a partial view of the virtual reality environment from a viewpoint of the second user 2.

Figure 2C:
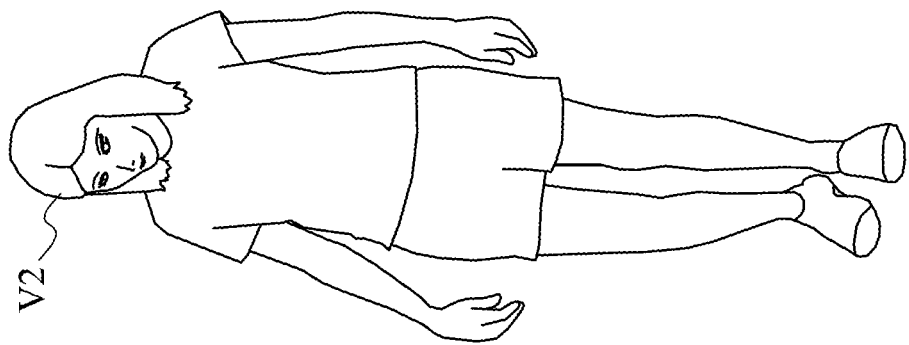
FIG. 2C is a schematic diagram of a system for providing a simulated environment according to the embodiments of FIG. 2A and FIG. 2B.
Figure 2C:
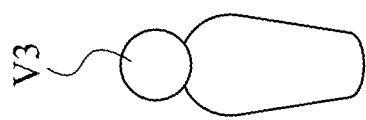
Figure 2C:
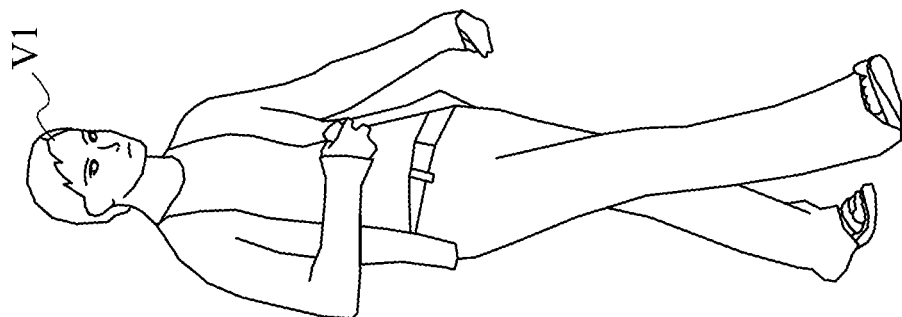

FIG. 2C is a schematic diagram of a system for providing a simulated environment according to the embodiments of FIG. 2A and FIG. 2B. Referring to FIG. 2C, together with FIG. 2A and FIG. 2B. In the embodiment, as illustrated in FIG. 2A, the optical sensor 400 may send the spatial vector of the first user gear 100 to the computing device 300. As illustrated in FIG. 2B, the optical sensor 500 may send the spatial vector of the second user gear 200 to the computing device 300. According to the spatial vector of the first user gear 100 and the spatial vector of the second user gear 200, the computing device 300 may provide a first user avatar V1 and a second user avatar V2 in the virtual reality environment. The first user avatar V1 may be provided at a first coordinate in the virtual reality environment. The second user avatar V2 may be provided at a second coordinate in the virtual reality environment. By keep tracking and sending the spatial vector of the first user gear 100 via the optical sensor 400, the first user avatar V1 provided by the computing device 300 may perform motions corresponding to the first user 1 in the first space. The difference between the embodiment shown in 2A-2C and the embodiment shown in 1A-1B is that the first user 1 and the second user 2 are located in two separated spaces in the former embodiment. In this case, the optical sensor 400 and the optical sensor 500 may be placed in these spaces, respectively, to track the spatial vectors of the first user gear 100 and the second user gear 200.

As shown in FIG. 2A, the first user 1 may select the doll 3 to be displayed in the virtual reality environment via the first user gear 100. The first user gear 100 may scan the doll 3 and generate scan information corresponding to the first contour of the doll 3. In some embodiments, the first user may select the doll 3 by pointing the doll 3 with a targeting window in the first visual interface. Since the doll 3 is selected by the targeting window, some optical sensors configured on the first user gear 100 may scan the contour and the volume of the doll 3, and the first user gear 100 may generate scan information accordingly. The scan information may be sent to the computing device 300 by the first user gear 100. The computing device 300 may illustrate a virtual doll V3 at a third coordinate in the virtual reality environment, and the virtual doll V3 is provided with a second contour corresponding to the first contour, wherein the second contour is substantially identical to the first contour of the true doll 3. The virtual doll V3 may be observed by the first user 1 and the second user 2 in the virtual reality environment if the third coordinate locates within their field of views. It is to say, when the first user 1 wearing the first user gear 100 and the second user 2 wearing the second user gear 200 are staying in different spaces, some individual detectors, such as the optical sensor 400 and the optical sensor 500 in the embodiment, may be provided in these spaces to detect the spatial vectors of the first user gear 100 or the second user gear 200 respectively. As such, the computing device 300 may determine the relative distance and the relative direction from the first user 1 to the second user 2 in the virtual reality environment according to the spatial vectors retrieved by the detectors. In some embodiments, the relative distance and the relative direction from the first user 1 to the second user 2 in the virtual reality environment may be determined according to the distance and direction from the first user 1 to the second user 2 in the real world.

Figure 3A:
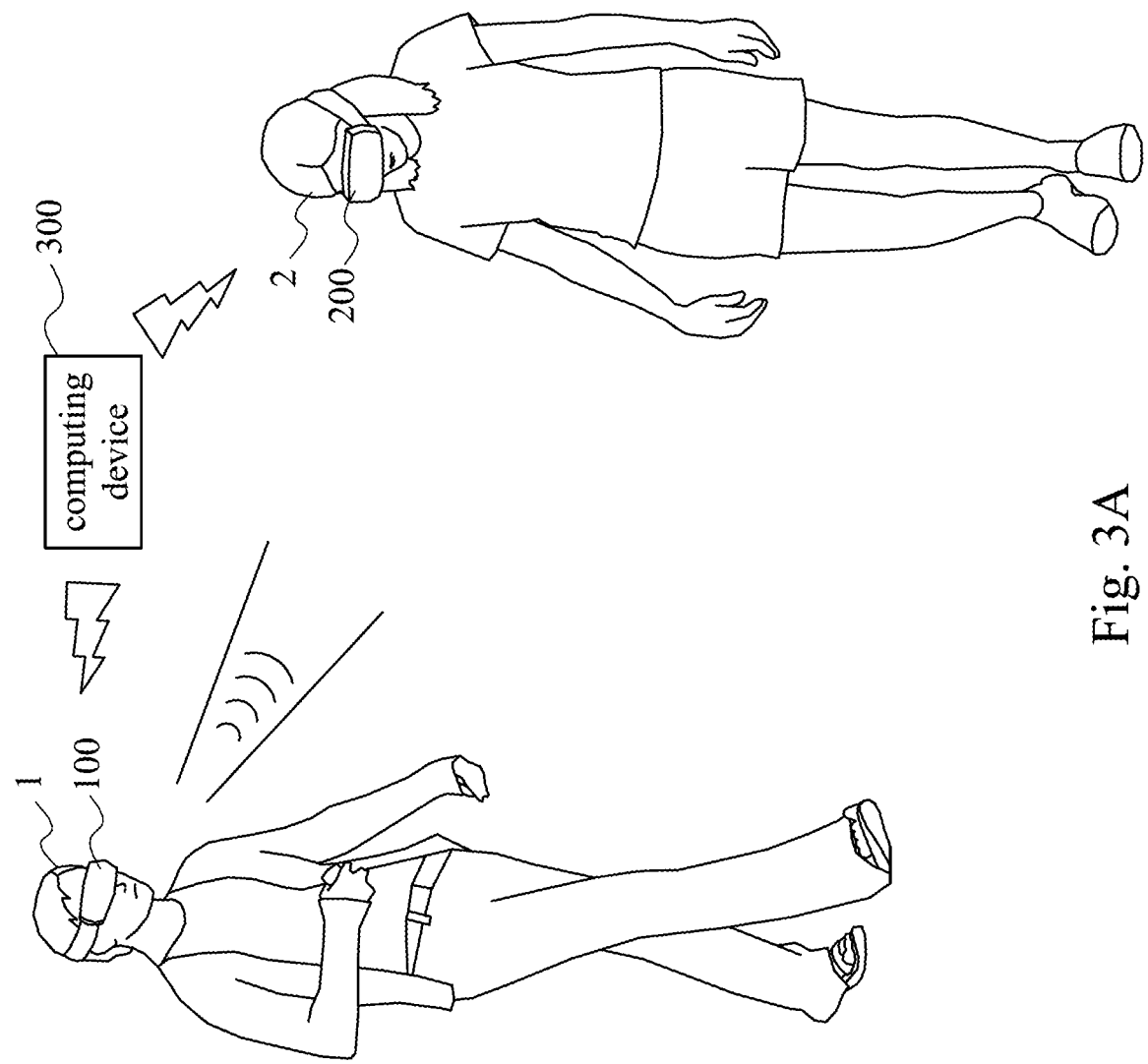
FIG. 3A is a schematic diagram of a system for providing a simulated environment according to some embodiments of the present disclosure.

FIG. 3A is a schematic diagram of a system for providing a simulated environment according to some embodiments of the present disclosure. As shown in FIG. 3A, a first user 1 and a second user 2 are in a first space. In the embodiment, the first user 1 wears a first user gear 100 and the second user 2 wears a second user gear 200. The first user gear 100 and the second user gear 200 may be HMDs (head-Mounted Displays). The first user gear 100 is configured to associate with a computing device 300 for displaying a first user scenario of a virtual reality environment to the first user 1 via a first visual interface, wherein a first coordinate is assigned corresponding to the first user gear 100 in the virtual reality environment. Said first visual interface can be a display of the first user gear 100, and wherein the first user scenario being displayed shows a partial view of the virtual reality environment from a viewpoint of the first user 1. In the same manner, the second user gear 200 is configured to associate with the computing device 300 for displaying a second user scenario of the virtual reality environment to the second user 2 via a second visual interface, wherein a second coordinate is assigned corresponding to the second user gear 200 in the virtual reality environment. Said second visual interface can be a display of the second user gear 200, and wherein the second user scenario being displayed shows a partial view of the virtual reality environment from a viewpoint of the second user 2. A first sensor may be configured on the first user gear 100 to detect objects in a first field of view in front of the first user 1. The second user 2 is currently located within the first field of view, which makes the second user 2 detectable to the first user gear 100. In some embodiment, the first sensor may be an optical detector, a resonance detector, a camera or a motion detector, and the first sensor may be used to track a first spatial vector of the first wearable device so that the spatial vector may be sent to the computing device for determining the relative distance and the relative direction between the first user gear 100 and second user gear 200.

Moreover, in the embodiment, the first user gear 100 is configured to output a first audio to the first user 1, wherein the first audio may be some background music or predetermined audible information of the virtual reality environment, such as talks of a non-player character or feedback audio from some specific interactions. In the same manner, the second user gear 200 is configured to output a second audio to the second user 2. The first audio and the second audio may be provided from the computing device 300 to the first user 1 and the second user 2, respectively, via some speakers configured on the first user gear 100 and the second user gear 200. The first user gear 100 is also configured to collect a first environmental around the first user gear 100, such as voice made by the first user 1 or sounds made by other devices or users, via a microphone configured on the first user gear 100. The second user gear 200 is configured to collect a second environmental sound around the second user gear 200 via a microphone configured on the second user gear 200 as well.

In the embodiment, as mentioned, the second user 2 is located within the first field of view so the first user gear 100 is able to track a spatial vector of the second user gear 200 with respect to the first user gear 100. The spatial vector of the second user gear 200 may be sent to the computing device 300 by the first user gear 100. The computing device 300 may determine a relative distance and a relative direction from the first user 1 to the second user 2 in the first space according to the spatial vector of the second user gear 200.

Figure 3B:
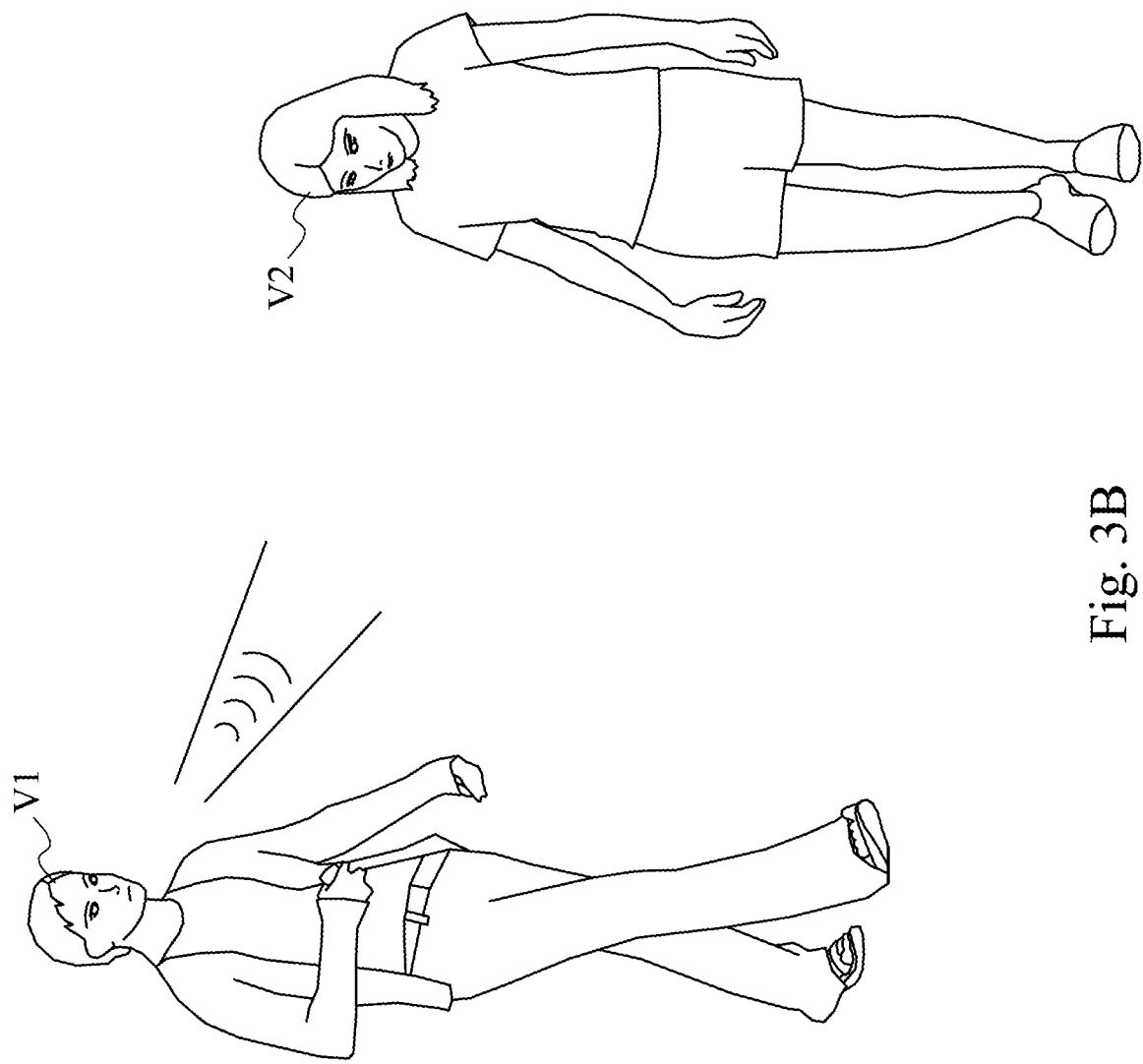
FIG. 3B is a schematic diagram of a system for providing a simulated environment according to the embodiments of FIG. 3A.

FIG. 3B is a schematic diagram of a system for providing a simulated environment according to the embodiments of FIG. 3A. As shown in FIG. 3A, the relative distance and a relative direction from the first user gear 100 to the second user gear 200 in the real world may be collected as index information. The index information may be provided as a reference for the computing device 300 to merge the first sound into the second audio. Therefore, the second user 2 may hear the second audio with the first sound as the first user 1 is speaking toward the second user 2 from the position where the first user 1 is located. As illustrated in FIG. 3B, it is illustrated as the first user avatar V1 located at the first coordinate is virtually speaking toward the second user avatar V2 located at the second coordinate. Vice versa, the computing device 300 may output the first audio merged with the second environmental sound via the first user gear 100 according to aforementioned fashion. In some embodiment, the first environmental sound may be merged into the second audio based on HRTF (Head Related Transfer Function) algorithm, and the second environmental sound may be merged into the first audio based on HRTF algorithm as well. The HRTF algorithm is a technique used for presenting audios. Since many factors, such as the size and shape of the head or the ears, may affect how an audio sounds like to a specific user, the HRTF algorithm is provided to reproduce the audio in order to make the specific user feels like that the reproduced audio is coming from a specific point. In other words, the HRTF algorithm is used to modify the directional effects of the audio when it is performed to the specific user.

In some embodiments, since the first user 1 and the second user 2 are in a common space, the first user gear 100 may collect both the first environmental sound made and the second environmental sound via the microphone configured on the first user gear 100. As such, the second environmental sound, probably made by the second user 2, may be sent to the computing device 300 and be merged into the first audio. In this way, the computing device 300 may continuously provide virtual reality audios to users with sounds made by them according to their relative distance and direction in the real world.

Figure 4A:
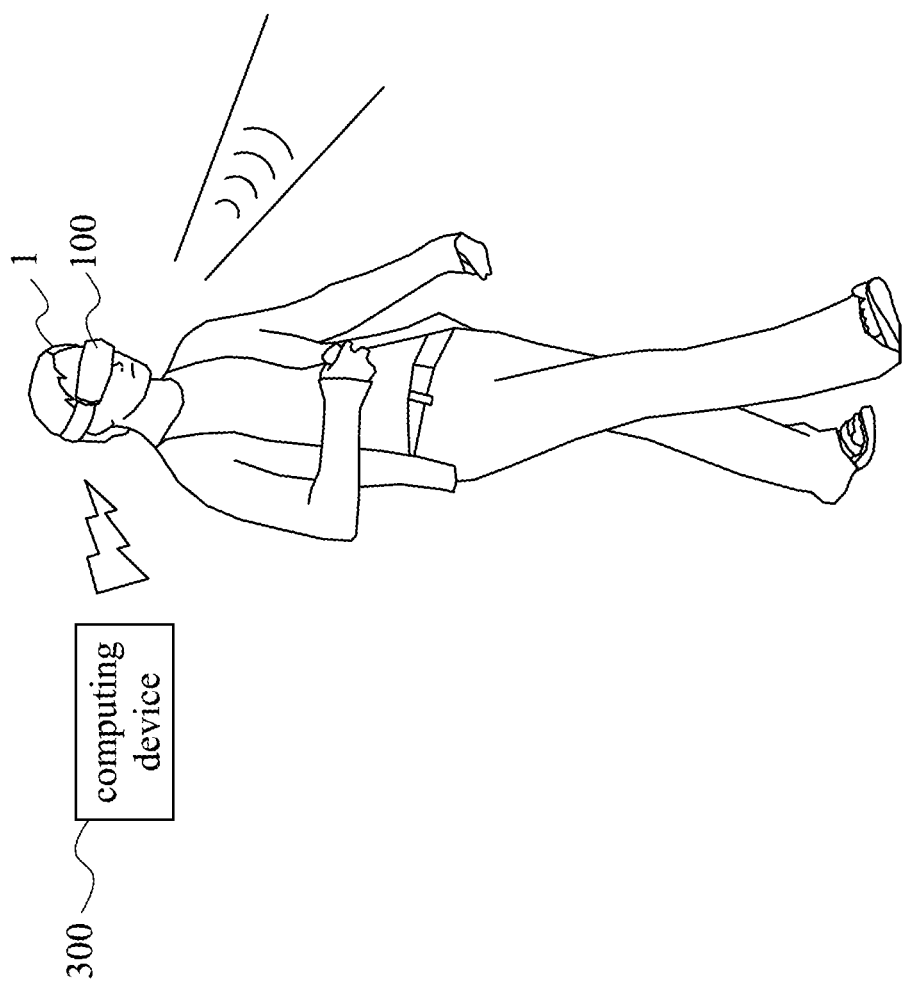
FIG. 4A is a schematic diagram of a system for providing a simulated environment according to some embodiments of the present disclosure.

FIG. 4A is a schematic diagram of a system for providing a simulated environment according to some embodiments of the present disclosure. As shown in FIG. 4A, a first user 1 is in a first space and wears a first user gear 100 on his head. The first user gear 100 may be a HMD (Head-Mounted Displays) configured to associate with a computing device 300 for displaying a first user scenario of a virtual reality environment to the first user 1 via a first visual interface. Furthermore, the first user gear 100 is configured to output a first audio to the first user 1, wherein the first audio may be some background music or predetermined audible information of the virtual reality environment. The first user gear 100 is also configured to collect a first environmental around first user gear 100, such as voice made by the first user 1 or laughs of the first user 1, via a microphone configured on the first user gear 100.

Figure 4B:
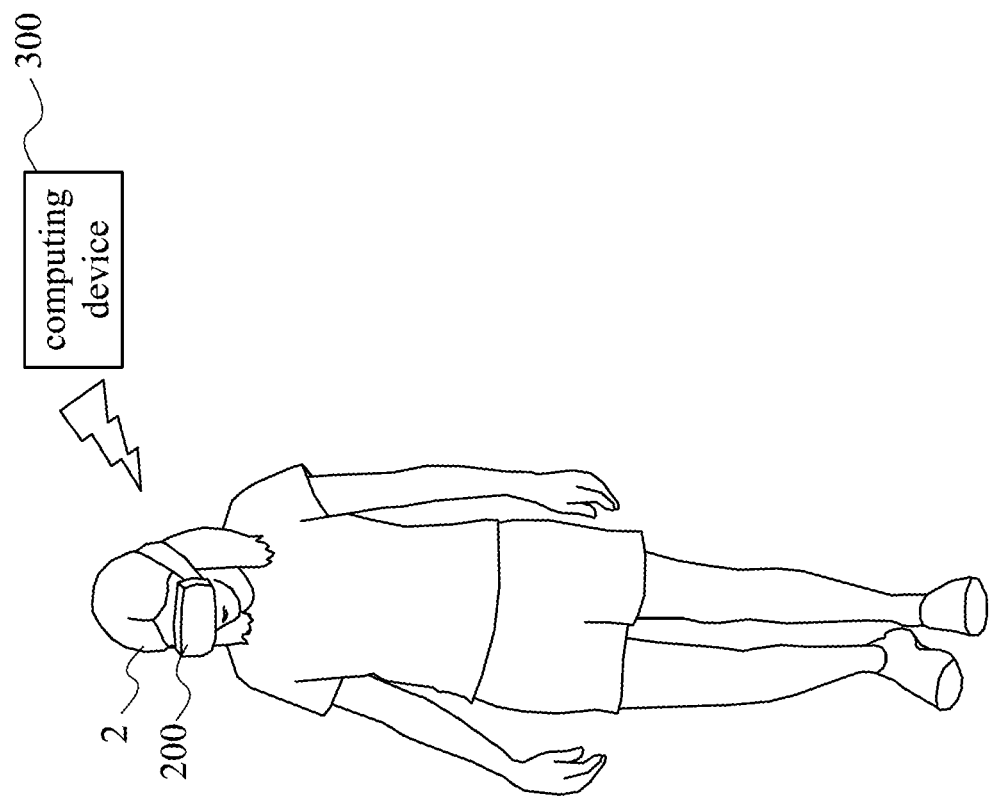
FIG. 4B is a schematic diagram of a system for providing a simulated environment according to some embodiments of the present disclosure.

FIG. 4B is a schematic diagram of a system for providing a simulated environment according to some embodiments of the present disclosure. As shown in FIG. 4B, a second user 2 is in a second space and wears a second user gear 200 on her head. The second user gear 200 is configured to associate with the computing device 300 for displaying a second user scenario of the virtual reality environment to the second user 2 via a second visual interface. Furthermore, the second user gear 200 is configured to output a second audio to the second user 2, wherein the second audio may be some background music or predetermined audible information of the virtual reality environment. The second user gear 200 is also configured to collect a second environmental sound around the second user gear 200 via a microphone configured on the second user gear 200.

Figure 4C:
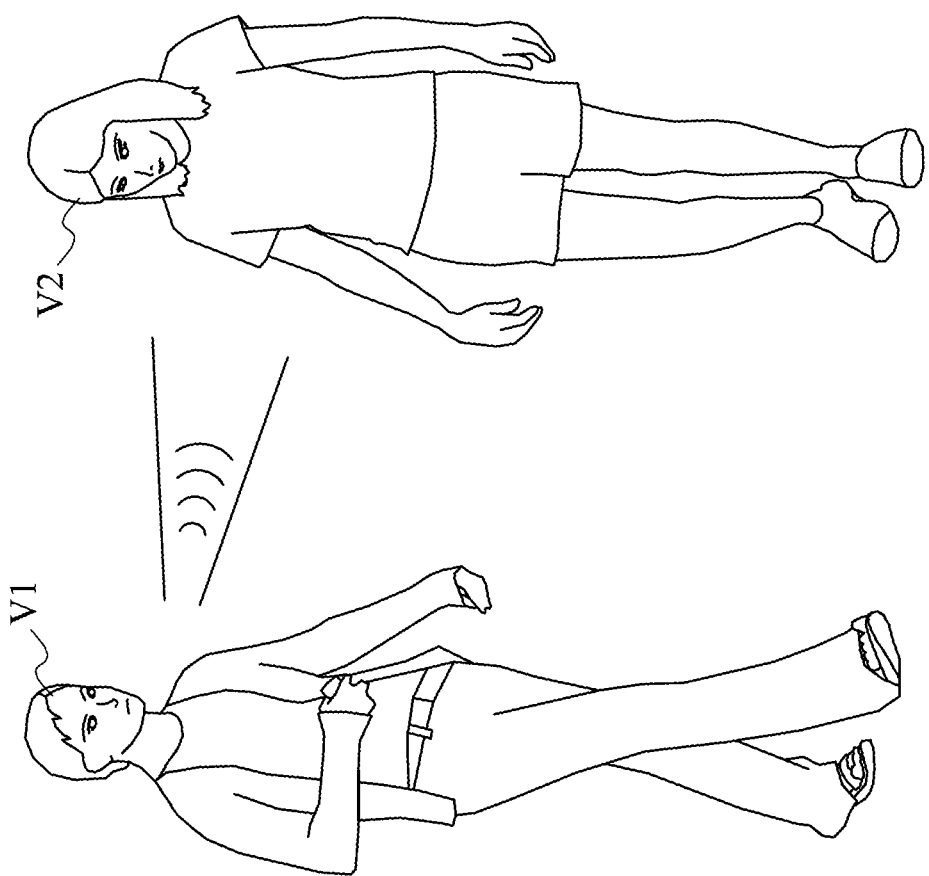
FIG. 4C is a schematic diagram of a system for providing a simulated environment according to the embodiments of FIG. 4A and FIG. 4B.

FIG. 4C is a schematic diagram of a system for providing a simulated environment according to the embodiments of FIG. 4A and FIG. 4B. As shown in FIG. 4A, FIG. 4B and FIG. 4C, the first environmental sound and the second environmental sound may be sent to the computing device

300. The computing device 300 may merge the first environmental sound into the second audio according to a first index, wherein the first index is determined by a relative distance and a relative direction between the first user avatar V1 and the second user avatar V2. The computing device 300 may also merge the second environmental sound into the first audio according to a second index, wherein the second index is also determined by the relative distance and the relative direction between the first user avatar V1 and the second user avatar V2.

It is to say, regardless where the first user 1 and the second user 2 truly located in the real world, the indexes are determined by the relative distance and the relative direction between the first user avatar V1 and the second user avatar V2 in the virtual reality environment. In this way, the computing device 300 may continuously provide virtual reality audios to the users with sounds made by them according to their relative distance and relative direction in the simulated environment.

Figure 5:
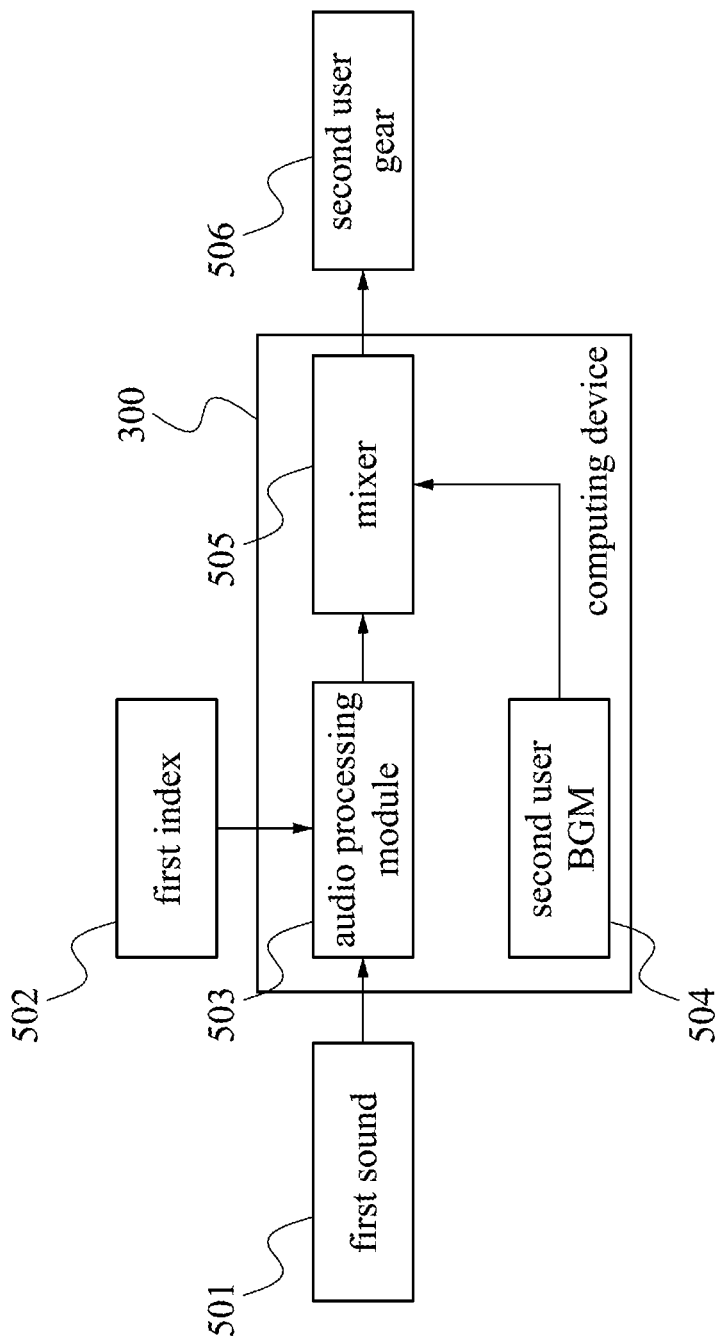
FIG. 5 is a schematic diagram of a system for providing a simulated environment according to some embodiments of the present disclosure.

FIG. 5 is a schematic diagram of a system for providing a simulated environment according to some embodiments of the present disclosure. As shown in FIG. 5, in an embodiment, a first sound 501 from a first user may be collected and sent to a computing device 300. The first sound 501 is being sent to an audio processing module 503, for example, a module for executing HRTF algorithms. A first index 502 may be sent to the audio processing 503 as well, wherein the first index is determined according to a relative distance and a relative direction from two coordinates being assigned to the first user and a second user respectively in a simulated environment. The audio processing module 503 may modulate the first sound 501 according to the first index 502. The first sound 501 being modulated may be sent to a mixer 505 of the computing device 300. A second user BGM (background music) 504 may be sent to the mixer 505 as well. The mixer 505 may mix the first sound 501 being modulated with the second user BGM 504 to generate a mixed result. The mixed result from the mixer 505 may be provided to the second user gear 506, by the mixer 505 of the computing device 300. Therefore, the second user wearing the second user gear 506 may hear the first sound 501 as it was spoke from the coordinate being assigned to the first user in the simulated environment.

Figure 6:
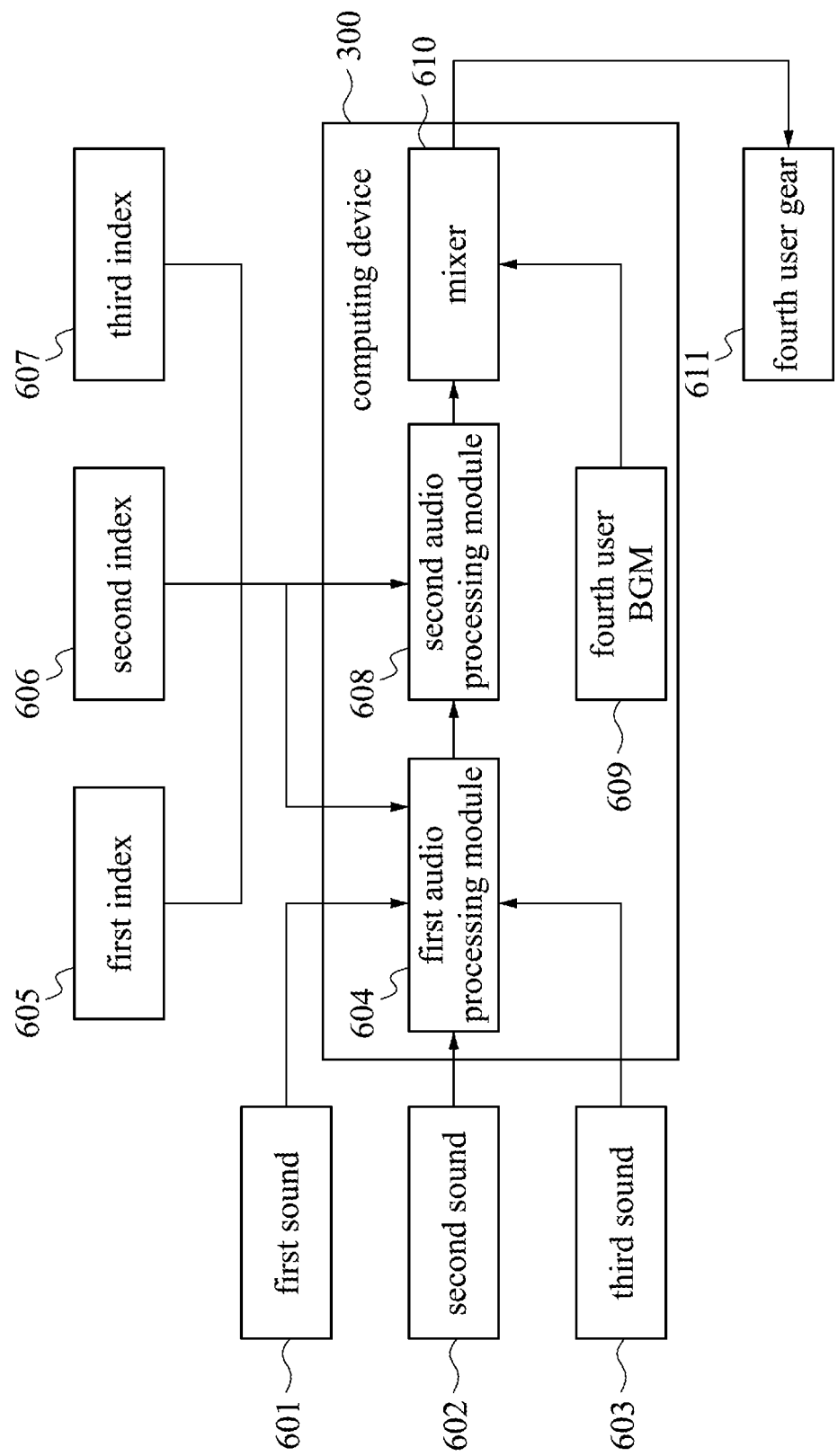
FIG. 6 is a schematic diagram of a system for providing a simulated environment according to some embodiments of the present disclosure.

FIG. 6 is a schematic diagram of a system for providing a simulated environment according to some embodiments of the present disclosure. As shown in FIG. 6, in an embodiment, a first sound 601 from a first user, a second sound 602 from a second user and a third sound 603 from a third user may be collected and sent to a first audio processing module 604 of a computing device 300. Moreover, the first audio processing module 604 may receive a first index 605, a second index 606 and a third index 607. The first index 605 is determined according to a relative distance and a relative direction from a coordinate being assigned to the first user to a coordinate being assigned to a fourth user in the simulated environment. The second index 606 is determined according to a relative distance and a relative direction from a coordinate being assigned to the second user to the coordinate being assigned to the fourth user in the simulated environment. The third index 607 is determined according to a relative distance and a relative direction from a coordinate being assigned to the third user to the coordinate being assigned to the fourth user in the simulated environment. The first audio processing module 604 may process these sounds with Higher Order Ambisonic algorithms according to these indexes, wherein the Higher Order Ambisonic algorithms are algorithms provided to emulate three-dimensional sound fields. The first sound 601, the second sound 602 and the third sound 603 being processed may be sent to a second audio processing module 608, wherein the second audio processing module 608 may be a module for executing HRTF algorithms. The first index 605, the second index 606 and the third index 607 may be sent to the second audio processing module 608 as well.

In the embodiment, the second audio processing module 608 may modulate the first sound 601 being processed according to the first index 605, and modulate the second sound 602 being processed according to the second index 606, and modulate the third sound 603 being processed according to the third index 607. The first sound 601, the second sound 602 and the third sound 603 that are modulated by the second audio processing module 608 may be sent to a mixer 610 of the computing device 300. The mixer 610 may merge the first sound 601, the second sound 602 and the third sound 603 being modulated with a fourth user BGM 609 and provide a mixed result to a fourth gear 611. Through the fourth gear 611, the fourth user may hear the first sound 601, the second sound 602 and the third sound 603 as they were spoke from the coordinate being assigned to corresponding users in the simulated environment.

Figure 7:
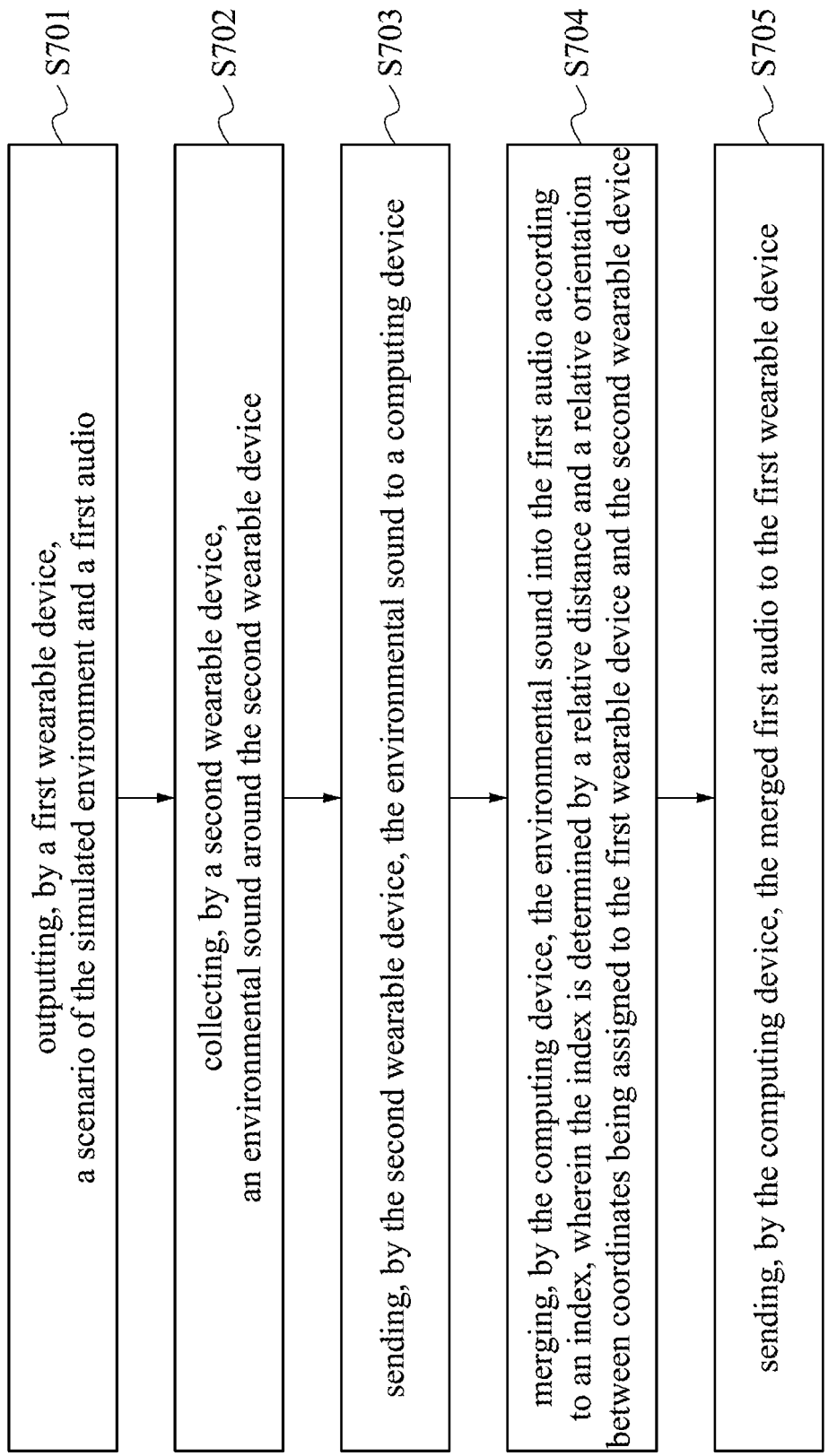
FIG. 7 is a flow chart of a method for providing a simulated environment according to some embodiments of the present disclosure.

FIG. 7 is a flow chart of a method for providing a simulated environment according to some embodiments of the present disclosure. The simulated environment is an environment built with virtual objects illustrated by computing devices, for example, may be a virtual reality environment, an augmented reality environment or a mixed reality environment. The steps of the method will be listed and explained in detail in following segments.

Step S701: outputting, by a first wearable device, a scenario of the simulated environment and a first audio. As shown in the embodiments of FIG. 1A, FIG. 2A, FIG. 3A and FIG. 4A, the first user gear 100 is configured to associate with the computing device 300 for displaying the first user scenario of the virtual reality environment to user 1 via the first visual interface, wherein the first coordinate is assigned to the first user gear 100 in the virtual reality environment. Aforesaid first visual interface can be a display of the first user gear 100, and wherein the first user scenario being displayed shows a partial view of the virtual reality environment from a viewpoint of the first user 1. The first user gear 100 is also configured to output the first audio to user 1, wherein the first audio may be some background music or predetermined audible information of the virtual reality environment.

Step S702: collecting, by a second wearable device, an environmental sound around the second wearable device. As shown in FIG. 1A, FIG. 2B, FIG. 3A and FIG. 4B, the second user gear 200 is configured to associate with the computing device 300 for displaying a second user scenario of the virtual reality environment to user 2 via a second visual interface, wherein a second coordinate is assigned to the second user gear 200 in the virtual reality environment. Furthermore, the second user gear 200 is also configured to collect a second environmental sound around the second user gear 200 via a microphone configured on the second user gear 200.

Step S703: sending, by the second wearable device, the environmental sound to a computing device. As shown in FIG. 1A, FIG. 2B, FIG. 3A and FIG. 4B, the second user gear 200 is configured to send the second environmental sound to the computing device 300. As shown in FIG. 3A, FIG. 4B, the second environmental sound may be sent to the computing device 300. As shown in FIG. 5, the collected first sound 501 may be sent to the audio processing module 503 and the mixer 505 of the computing device 300. As shown in FIG. 6, the collected sounds may be sent to the first audio processing module 604, the second audio processing module 608 and the mixer 610 of the computing device 300.

Step S704: merging, by the computing device, the environmental sound into the first audio according to an index, wherein the index is determined by a relative distance and a relative direction between coordinates being assigned to the first wearable device and the second wearable device. As shown FIG. 5, the collected first sound 501 may be sent to the audio processing module 503 of the computing device 300 and being modulated according to the first index 502. The first sound 501 being modulated may be processed with the second user BGM 504, by the mixer 505 of the computing device 300. As shown FIG. 6, the collected second sound 602 may be sent to the first audio processing module 604 of the computing device 300 and being processed. The second sound 602 being processed may be modulated, by the second audio processing module 608 of the computing device 300, according to the second index 606, wherein the second index 606 is determined based on the relative distance and the relative direction between the coordinates being assigned to the second user and the fourth user. The second sound 602 being modulated by the second audio processing module 608 may then be provided to the mixer 610 of the computing device 300. The mixer 610 may mix the second sound 602 being modulated with the fourth user BGM 609.

Step S705: sending, by the computing device, the merged first audio to the first wearable device. As shown in FIG. 5, the mixed result may be sent from the mixer 505 to the second user gear 506, and the second user gear 506 may output the mixed result to the second user. As shown in FIG. 6, the mixed result may be sent from the mixer 610 to the fourth user gear 611, and the fourth user gear 611 may output the mixed result to the fourth user.

As described above, present disclosure provides an approach to perform directional sound effects to users in a simulated environment. Through the first wearable device and the second wearable device, the computing device may not only obtain environmental sounds but also the indexes regarding to the relative distance and direction between these wearable devices. By utilizing some audio algorithms, such as HRTF and HOA, the computing device may merge the environmental sounds, especially the voice of speaking, to the audios being presented to the users according to these indexes. Therefore, whenever users are located in the same or different places, audio merged with the environmental sounds may be provided to the wearable devices with directional effects. As such, when a user receives the merged audio via the wearable device, he may feel like that the other users are speaking toward him from a correct direction.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A virtual reality system for providing a virtual reality simulated environment, comprising:

a computing device, configured to generate a scenario of the VR simulated environment and to connect to both a first head-mounted display (HMD) device and a second HMD device;

the first HMD device in a first space, configured to output the scenario of the VR simulated environment, to output a first audio, to collect a first environmental sound comprising a first user voice, to retrieve a first spatial vector with respect to the first space of the first HMD device, and to transmit the first environmental sound and the first spatial vector to the computing device;

the second HMD device in a second space that is different from the first space, configured to output the scenario of the VR simulated environment, to output a second audio, to collect a second environmental sound comprising a second user voice, to retrieve a second spatial vector with respect to the second space of the second HMD device, to transmit the second environmental sound and the second spatial vector to the computing device, wherein the first HMD device is spaced apart from the second HMD device by a real distance; and the computing device, further configured to receive the first environmental sound comprising the first user voice, the first spatial vector with respect to the first space, the second environmental sound comprising the second user voice and the second spatial vector with respect to the second space to automatically assign coordinates of the first HMD device and the second HMD device in the VR simulated environment according to the received first spatial vector with respect to the first space and the received second spatial vector with respect to the second space, to determine a relative distance and a relative direction between the coordinate assigned to the first HMD device in the VR simulated environment and the coordinate assigned to the second HMD device in the VR simulated environment, wherein the first user and the second user communicate to each other in the VR simulated environment through the first HMD device and the second HMD device, to merge the second environmental sound into the first audio according to the relative distance and the relative direction in the VR simulated environment and send the merged first audio to the first HMD device, and to merge the first environmental sound into the second audio according to the relative distance and the relative direction in the VR simulated environment and send the merged second audio to the second HMD device, and wherein; and the real distance between the first HMD device in the first space and the second HMD device in the second space is inconsistent with the relative distance between the coordinates assigned to the first HMD device and the second HMD device in the VR simulated environment.

2. The virtual reality system of claim 1, wherein the second HMD device is further configured to retrieve a face characteristic and send the face characteristic to the computing device, and wherein the face characteristic is provided to illustrate a face pattern of an avatar in the scenario.

3. The virtual reality system of claim 1, wherein the second HMD device is further configured to scan an object to generate scan information and send the scan information to the computing device, wherein the object is selected by pointing the object through a targeting window in a display of the second HMD device, and wherein the scan information is provided to illustrate a virtual object having a contour corresponding to the object in the scenario of the VR simulated environment.

4. The virtual reality system of claim 1, wherein the first HMD device further comprises a detector, which is configured to track a spatial vector of the second HMD device with respect to the first HMD device, wherein the spatial vector is sent to the computing device for determining the relative distance and the relative direction.

5. The virtual reality system of claim 4, wherein the detector comprises an optical detector, a resonance detector, a camera and a motion detector.

6. The virtual reality system of claim 1, further comprising:
a first detector, placed in the first space, provided to track the first spatial vector of the first HMD device with respect to the first space; and
a second detector, placed in the second space, provided to track the second spatial vector of the second HMD device with respect to the first space;
wherein the first spatial vector and the second spatial vector are sent to the computing device for determining the relative distance and the relative direction.

7. The virtual reality system of claim 6, wherein the first detector and the second detector comprise an optical detector, a resonance detector, a camera and a motion detector.

8. The virtual reality system of claim 6, wherein:
the first detector continuously tracks the first spatial vector of the first HMD device with respect to the first space, and sends the continuously tracked first spatial vector to the computing device;
the second detector continuously tracks the second spatial vector of the first HMD device with respect to the second space, and sends the continuously tracked second spatial vector to the computing device;
the computing device varies the coordinates of the first HMD device and the second HMD device in the VR simulated environment according to the received and continuously tracked first spatial vector and the second spatial vector, respectively;
the computing device determines variations in the relative distance and the relative direction between the coordinates in the VR simulated environment being assigned to the first HMD device and the second HMD device;
the computing device varies the merging of the second environmental sound into the first audio according to the variations in the relative distance and the relative direction, and sends the merged first audio to the first HMD device; and
the computer device varies the merging of the first environmental sound into the second audio according to the variations in the relative distance and the relative direction, and sends the merged second audio to the second HMD device.

9. The virtual reality system of claim 1, wherein the sound is merged into the first audio based on HRTF (Head Related Transfer Function).

10. A method for providing a virtual reality (VR) simulated environment, comprising:
generating, by a computing device, a scenario of the VR simulated environment and to connect to both a first head-mounted display (HMD) device in a first space and the second HMD device in a second space that is different from the first space wherein the first HMD device is spaced apart from the second HMD device by a real distance;
outputting, by the first HMD device, the scenario of the VR simulated environment and a first audio;
collecting, by the first HMD device, a first environmental sound comprising a first user voice;
retrieving, by the first HMD device, a first spatial vector with respect to the first space of the first HMD device;
transmitting, by the first HMD device, the first environmental sound and the first spatial vector to the computing device;
outputting, by the second HMD device, the scenario of the VR simulated environment, and a second audio;
collecting, by the second HMD device, a second environmental sound comprising a second user voice;
retrieving, by the second HMD device, a second spatial vector with respect to the second space of the second HMD device;
transmitting, by the second HMD device, the second environmental sound and the second spatial vector to the computing device;
receiving, by the computing device, the first environmental sound comprising the first user voice, the first spatial vector with respect to the first space, the second environmental sound comprising the second user voice and the second spatial vector with respect to the second space to automatically assign coordinates of the first HMD device and the second HMD device in the VR simulated environment according to the received first spatial vector with respect to the first space and the received second spatial vector with respect to the second space;
determining, by the computing device, a relative distance and a relative direction between the coordinates assigned to the first HMD device in the VR simulated environment and the coordinate assigned to the second HMD device in the VR simulated environment wherein the first user and the second user communicate to each other in the VR simulated environment through the first HMD device and the second HMD device;
merging, by the computing device, the second environmental sound into the first audio according to the relative distance and the relative direction in the VR simulated environment and sending the merged first audio to the first HMD device; and
merging, by the computing device, the first environmental sound into the second audio according to the relative distance and the relative direction in the VR simulated environment and send the merged second audio to the second HMD device;
wherein the real distance between the first HMD device in the first space and the second HMD device in the second space is inconsistent with the relative distance between the coordinates assigned to the first HMD device and the second HMD device in the VR simulated environment.

11. The method of claim 10, further comprising:
retrieving, by the second HMD device, a face characteristic;
sending, by the second HMD device, the face characteristic to the computing device; and
illustrating, by the computing device, a face pattern of an avatar in the VR simulated environment according to the face characteristic.

12. The method of claim 10, further comprising:
pointing, by the second HMD device, a physical object through a targeting window in a display of the second HMD device, scanning, by the second HMD device, the physical object to generate scan information;

sending, by the second HMD device, scan information to the computing device; and illustrating, by the computing device, a virtual object having a contour corresponding to the physical object in the scenario of the VR simulated environment according to the scan information, wherein the objected is selected by pointing the object through a targeting window in a display of the second HMD device.

13. The method of claim 10, further comprising:

tracking, by a detector configured in the first HMD device, a spatial vector of the second HMD device with respect to the first HMD device; and sending, by the first HMD device, the spatial vector to the computing device for determining the relative distance and the relative direction.

14. The method of claim 13, wherein the detector comprises an optical detector, a resonance detector, a camera and a motion detector.

15. The method of claim 10, further comprising:

tracking, by the first detector placed in the first space, the first spatial vector of the first HMD device with respect to the first space;

tracking, by the second detector placed in the second space, the second spatial vector of the second HMD device with respect to the second space;

sending, by the first detector, the first spatial vector to the computing device;

sending, by the second detector, the second spatial vector to the computing device; and determining, by the computing device, the relative distance and the relative direction according to the first spatial vector and the second spatial vector.

16. The method of claim 15, wherein the first detector and the second detector comprise an optical detector, a resonance detector, a camera and a motion detector.

17. The method of claim 10, wherein the sound is merged into the first audio based on HRTF (Head Related Transfer Function).

* * * * *